US008595301B2

(12) United States Patent
Banks et al.

(10) Patent No.: US 8,595,301 B2
(45) Date of Patent: Nov. 26, 2013

(54) MESSAGE DELIVERY IN MESSAGING NETWORKS

(75) Inventors: Andrew David Banks, Hampshire (GB); Gavin David Beardall, Hampshire (GB); Stephen James Hobson, Middlesex (GB); Ian Charles Vanstone, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 287 days.

(21) Appl. No.: 12/331,528

(22) Filed: Dec. 10, 2008

(65) Prior Publication Data

US 2009/0193090 A1    Jul. 30, 2009

(30) Foreign Application Priority Data

Jan. 25, 2008   (EP) .................................. 08150654

(51) Int. Cl.
*G06F 15/16* (2006.01)
(52) U.S. Cl.
USPC .......................................................... 709/206
(58) Field of Classification Search
USPC .......................................................... 709/206
See application file for complete search history.

(56) References Cited

U.S. PATENT DOCUMENTS

| | | | |
|---|---|---|---|
| 2002/0087704 A1* | 7/2002 | Chesnais et al. | 709/228 |
| 2005/0033841 A1 | 2/2005 | McCarthy et al. | |
| 2005/0228867 A1* | 10/2005 | Osborne et al. | 709/206 |
| 2007/0180075 A1* | 8/2007 | Chasman et al. | 709/223 |
| 2008/0140720 A1* | 6/2008 | Six et al. | 707/104.1 |

FOREIGN PATENT DOCUMENTS

| | | |
|---|---|---|
| JP | 08-039212 A | 9/1997 |
| JP | 16-131240 A | 11/2005 |
| JP | 18-059329 A | 9/2007 |
| JP | 18-093403 A | 10/2007 |
| KR | 100259419 B1 | 6/2000 |
| WO | 9707617 A1 | 2/1997 |
| WO | 2005025155 A1 | 3/2005 |

OTHER PUBLICATIONS

Marlene Benigar and Richard Frey, Patent Cooperation Treaty International Search Report and Written Opinion for PCT/EP2009/050523, May 8, 2009, pp. 1-10, Published by the European Patent Office International Searching Authority, Netherlands and Germany.
State Intellectual Property Office of the People's Republic of China, Office Action for Chinese Counterpart Application No. 200980103028.5, Action dated May 14, 2012, pp. 1-7, P.R. China. (English translation not available).
United States Patent and Trademark Office, Examiner Initiated Interview Summary for U.S. Appl. No. 12/331,528, Aug. 8, 2012, pp. 1-2, Alexandria, VA, USA.

* cited by examiner

*Primary Examiner* — Sulaiman Nooristany
(74) *Attorney, Agent, or Firm* — Lee Law, PLLC; Christopher B. Lee

(57) ABSTRACT

A method and system for message delivery in messaging networks is provided. The system provides a group of replicated queues for messages that are operable to be identified by an application before a message is read. The group of replicated queues are defined in association with a group of message managing systems, where a message is sent to each of the group of replicated queues to be accessible using any one of the group of message managing systems. The method includes creating a message including a unique identifier, and sending the message to each of a group of replicated queues with the message identifiable by the unique identifier information prior to the message being consumed.

24 Claims, 7 Drawing Sheets

MESSAGE DELIVERY IN MESSAGING NETWORKS

RELATED APPLICATIONS

This application claims priority to and claims the benefit of European Patent Application Serial No. 08150654.5, which was filed in the European Patent Office/United Kingdom Processing Location on Jan. 25, 2008, and which is incorporated herein by reference in its entirety.

BACKGROUND OF THE INVENTION

1. Field of the Invention

This invention relates to the field of message delivery in messaging networks. In particular, the invention relates to message delivery of messages that can be uniquely identified by the consumer before being consumed.

2. Related Art

An example of a message that can be uniquely identified before being consumed is a reply message in a request/reply system. Within a messaging network requesters send requests and receive replies, and responders receive requests and send replies.

A level of high availability may be achieved at the front end of the messaging network by providing a plurality of message managing systems to which requesters connect and using a workload balancing mechanism that routes requester connections to available message managing systems. The backend may also be made more available by providing a plurality of message managing systems to which responders can connect and using a workload balancing mechanism on the front end message managing systems that routes request messages to available backend message managing systems. Requests may continue to be processed even if a front or backend messaging manager system is unavailable.

The overall problem is the availability issue associated with the routing of replies when affinities exist. Replies are typically routed by a backend messaging manager system to a particular front end messaging manager system and not workload balanced. The front end messaging manager system used is that through which the corresponding request message was sent. This is because requesters typically send a request and remain connected to the same messaging manager system until they received the corresponding reply. There is an affinity created between the reply and the front end messaging manager system. This creates a problem for the availability of a reply at the front end because the completion of the requester's work (send request, receive reply) is dependent on the continued availability of the messaging manager system from which it sent the request. If the messaging manager system fails after the request is routed to the backend and before the reply is routed to the front end, then the reply is held at the backend until the front end messaging manager system becomes available.

A further problem exists if the requester disconnects or is disconnected from a front end messaging manager system after it sends a request, but before the reply is received. Requester connections are workload balanced. So when the requester re-connects (for the purpose of receiving the reply), its connection could be workload balanced to a different front end messaging manager system to which it was originally connected. This results in a situation where the reply is unavailable to the requester until it re-connects to the correct front end messaging manager system.

One known solution to this problem is to use separate connection logic for requesters depending on their state. Before sending a request, the connection is workload balanced and after sending a request, but before receiving the reply, the connection is not workload balanced, but made to the messaging manager system with which the requester has an affinity.

BRIEF SUMMARY OF THE INVENTION

According to a first aspect of the present invention there is provided a method for message delivery in messaging networks, comprising: creating a message including a unique identifier; and sending the message to each of a plurality of replicated queues, where the message is identifiable by the unique identifier prior to being consumed.

According to a second aspect of the present invention there is provided a system for message delivery in a messaging network, comprising: a messaging network including a plurality of message managing systems provided on one or more processors; a plurality of replicated queues for messages which are operable to be identified by an application before a message is read, the plurality of replicated queues being defined in association with the plurality of message managing systems; where the message is sent to each of the plurality of replicated queues to be accessible using any one of the plurality of message managing systems.

According to a third aspect of the present invention there is provided an apparatus for message delivery in a messaging network comprising a plurality of message managing systems provided on one or more processors; the apparatus including: means for creating a message comprising a unique identifier; and means for sending the message to each of a plurality of replicated queues, where the message is identifiable by the unique identifier prior to being consumed.

According to a fourth aspect of the present invention there is provided a computer program product stored on a computer readable storage medium for message deliver in messaging networks, comprising computer readable program code means for performing the steps of: creating a message including a unique identifier; and sending the message to each of a plurality of replicated queues with the reply message identifiable by the unique identifier prior to being consumed.

Two parts to the solution are:
1) Replies are replicated so that instead of one reply being sent to a specific front end messaging manager system, a reply is sent to all front end message managing systems.
2) Requesters may connect to any front end messaging manager system to receive reply messages. Reply messages on the other front end message managing systems are deleted automatically.

As such, the invention may increase availability of replies to requesters by removing the requirement for requesters to receive replies from the same messaging manager system from which they sent the request. The invention also removes the requirement for separate connection logic in requesters, allowing them to be workload balanced to available message managing systems regardless of the requester's state, and to receive replies at any front end messaging manager system.

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Figure 1:
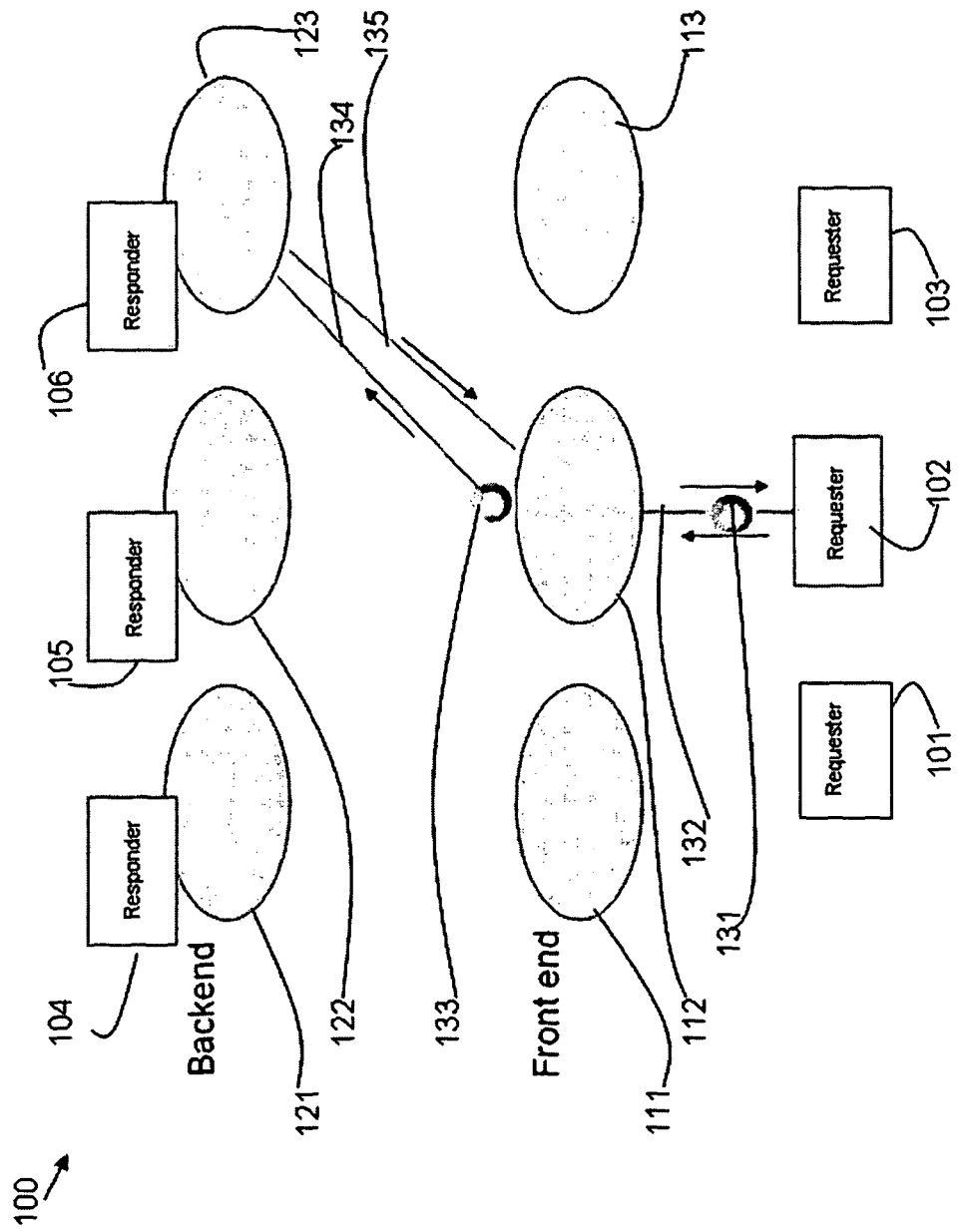
FIG. 1 is a schematic diagram of a messaging system as known in the prior art.

Referring to FIG. 1, a messaging network system 100 is shown as known in the prior art. Within the messaging network system 100, requesters 101-103 (send request, receive reply) and responders 104-106 (receive request, send reply) may be connected to separate message managing systems 111-113, 121-123. The messaging network system 100 uses front end messaging manager system 111-113 for requester 101-103 connections and backend message managing systems 121-123 for responder 104-106 connections. Message managing systems 111-113, 121-123 may be, for example, queue managers.

A level of high availability may be achieved at the front end of the messaging network by providing several front end message managing systems 111-113 to which requesters 101-103 may connect and using a workload balancing mechanism 131 (e.g. IP load balancer or messaging manager system feature) that routes requester connections to available message managing systems 111-113. For example, in FIG. 1 a channel 132 is shown from a requester 102 to the messaging managing system 112 (selected by workload balancing) through which messages flow.

The backend may be made more available by providing several message managing systems 121-123 to which responders 104-106 may connect. A workload balancing mechanism 133 on the front end message managing systems 111-113 routes requests to available backend messaging managing systems 121-123. For example, FIG. 1 shows a request 134 routed to the backend messaging managing system 123 and a reply 135 routed to the front end messaging managing system 112.

The messaging network system 100 may continue to process requests, by sending requests from the requester 101 through the front end and backend messaging managing systems 111-113, 121-123 to a responder 106, even if one or more of the front or backend messaging managing systems is unavailable.

Figure 2:
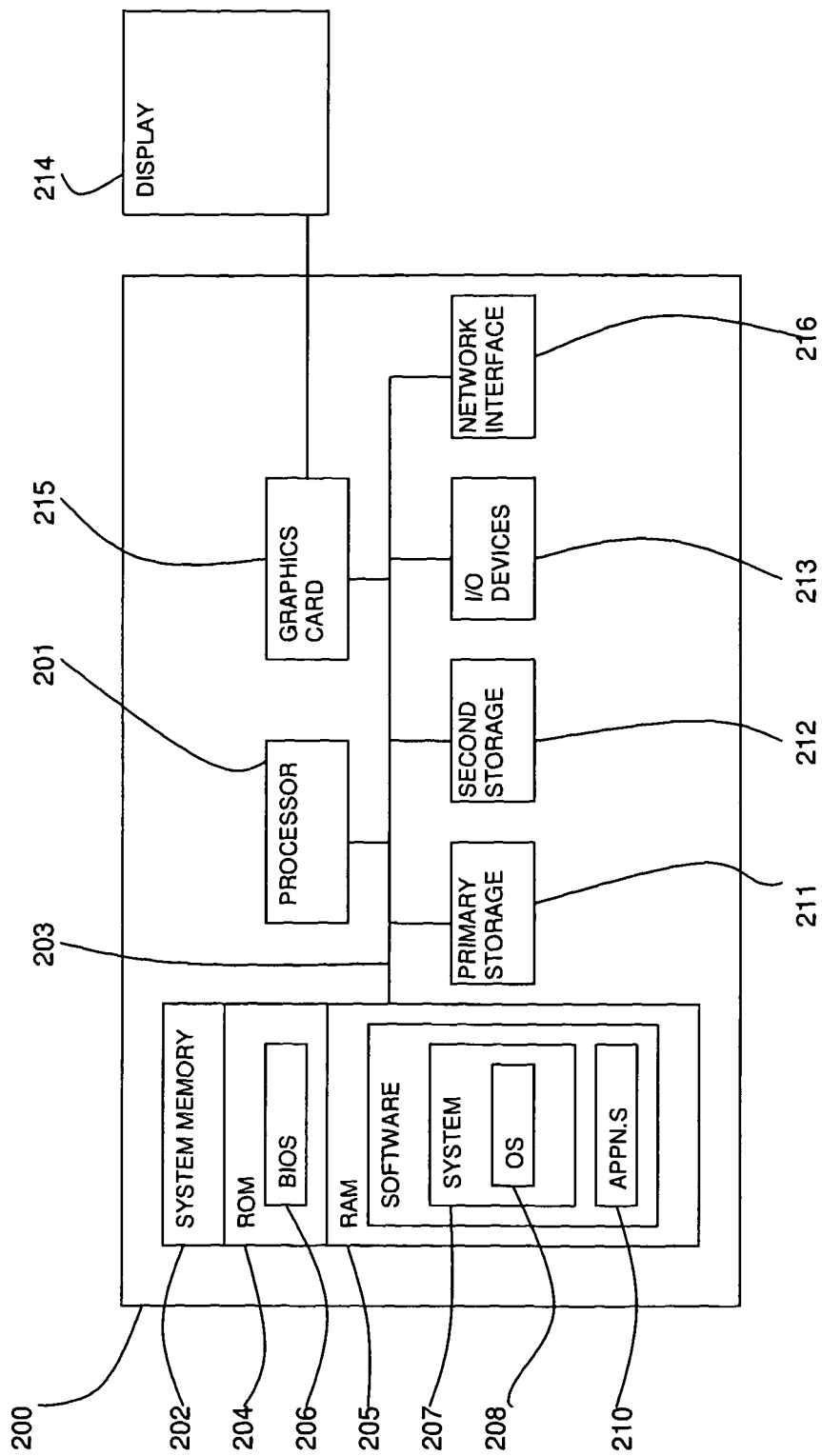
FIG. 2 is a block diagram of a computer system in which the present invention may be implemented.

Referring to FIG. 2, an exemplary system in which a messaging manager system in accordance with the present subject matter may be implemented includes a data processing system 200 suitable for storing and/or executing program code including at least one processor 201 coupled directly or indirectly to memory elements through a system bus 203. The memory elements may include local memory employed during actual execution of the program code, bulk storage, and cache memories which provide temporary storage of at least some program code in order to reduce the number of times code must be retrieved from bulk storage during execution.

The memory elements may include a system memory 202 in the form of a read only memory (ROM) 204 and a random access memory (RAM) 205. A basic input/output system (BIOS) 206 may be stored in the ROM 204. System software 207 may be stored in the RAM 205 including operating system software 208. Software applications 210 may also be stored in the RAM 205.

The data processing system 200 may also include a primary storage means 211, such as a magnetic hard disk drive, and a secondary storage means 212, such as a magnetic disc drive and an optical disc drive. The drives and their associated computer-readable media provide non-volatile storage of computer-executable instructions, data structures, program modules and other data for the data processing system 200. Software applications may be stored on the primary and secondary storage means 211, 212 as well as the system memory 202.

The data processing system 200 may operate in a networked environment using logical connections to one or more remote computers via a network interface 216.

Input/output (I/O) devices 213 may be coupled to the system either directly or through intervening I/O controllers. A user may enter commands and information into the data processing system 200 through input devices such as a keyboard, pointing device, or other input devices (for example, microphone, joy stick, game pad, satellite dish, scanner, or the like). Output devices may include speakers, printers, etc. A display device 214 may also be connected to the system bus 203 via an interface, such as a video adapter graphics card 215.

A messaging manager system includes a program defining a registry, a messaging manager system definition, and local default queue definitions.

In the described method and system, a special type of queue is provided which is used to hold messages. This queue is referred to as a replicated queue (RQ). RQs are designed for messages that may be uniquely identified by consumers before those consumers have received the message (e.g. reply messages with unique identifier).

RQs are defined on a plurality of message managing systems, either using a manual definition on every messaging manager system or using one manual definition and an auto-definition mechanism to replicate the definition on other message managing systems. Using an auto-definition mechanism supports dynamic creation of RQs (e.g. those defined in response to application activity). Message managing systems in the messaging network are automatically made aware of the RQs in the messaging network.

When a message is sent to an RQ (e.g. a reply message) it has a unique identifier. The unique identifier may be specified by an application or by the messaging manager system. Either the messaging manager system or an application replicates the message so that every messaging manager system in the messaging network that hosts the RQ receives a copy. The replicated messages are sent using any messaging technology.

Each messaging manager system that hosts the RQ receives a copy of the replicated message. Applications may connect to any of the message managing systems hosting the RQ to receive their messages (identified by a unique identifier).

Once an application has consumed (e.g., processed) one of the replicated messages it has completed its work, but the other message managing systems that host the RQ still hold copies of the message. These remaining messages use system resources and may therefore be deleted. It is advantageous for this deletion to be carried out automatically.

When the message is consumed by an application, the messaging manager system sends a notification message to all other message managing systems which host the RQ. The notification messages are sent using any messaging technology.

This notification message contains both the name of the RQ to which the reply was sent and the unique identifier of the consumed message. This notification message is delivered to a message deletion component. This component may be an external program or part of the messaging system.

When the message deletion component receives a notification message it deletes the uniquely specified message from the specified RQ. Reply messages on the other RQs may exist for some time after an application has received its message. It is acceptable for these messages to remain on RQs because their existence does not affect other applications. This is because applications consume messages using a unique identifier, and the identifier of these messages does not match that used by other applications.

It is possible for the message deletion component to receive a notification message before the corresponding replicated message arrives on the RQ, therefore notification messages, for which the corresponding replicated message is unavailable, are retained. When the corresponding replicated message arrives, both it and the retained notification message are deleted.

It is possible that either the notification message or the replicated message do not reach a specific messaging manager system. For instance where communications links between message managing systems are down or messages expire. Notifications may have the same expiration as the replicated message.

In summary, the following procedures are undertaken:
When a message is sent to an RQ, message managing systems local to the sender replicate the message to every instance of the RQ.
When a replicated message is received by an application, the other replicas held on RQs are automatically deleted.

The following examples explain how RQs may be used for sending replies.

Figure 3A:
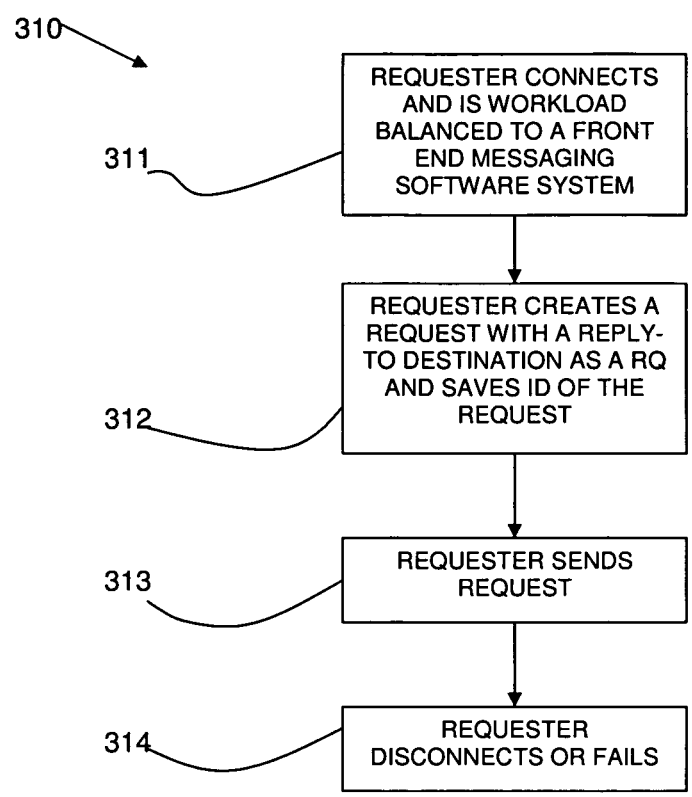
FIG. 3A is a flow chart of processing carried out by a requester in accordance with aspects of the present invention.

Referring to FIG. 3A, a flow diagram 310 shows the process steps carried out by a requester. A requester connects 311 to a messaging network and is workload balanced to a particular front end messaging manager system. The requester creates 312 a request with a reply-to destination as an RQ and saves the identifier of the request. The requester sends 313 the request. The requester may then disconnect, or the connection may fail 314.

The messaging network workload balancing mechanism executes and chooses a backend messaging manager system to which the request is sent.

Figure 3B:
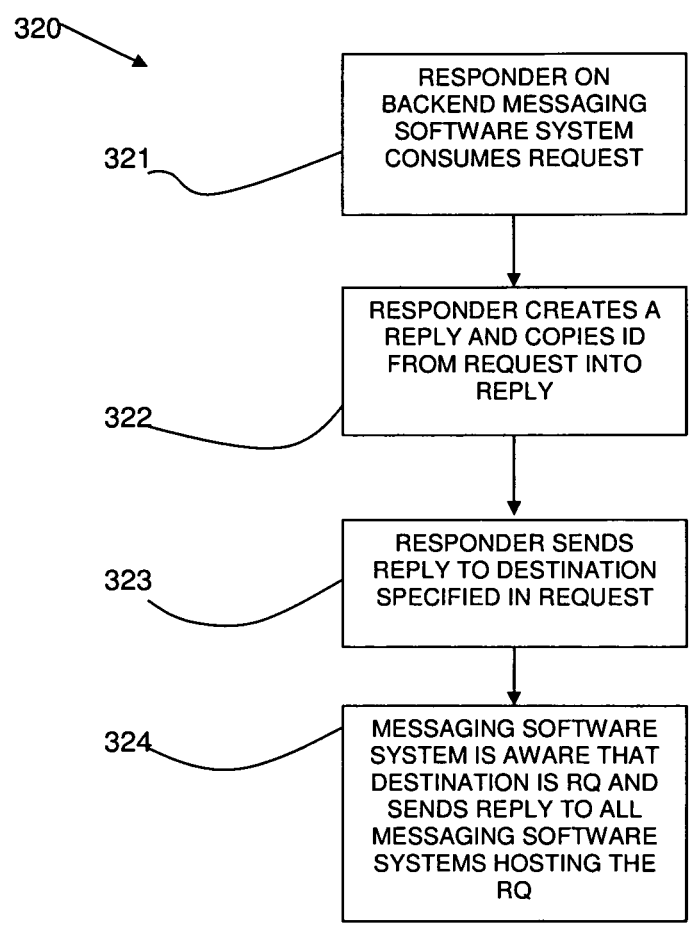
FIG. 3B is a flow chart of processing carried out by a responder in accordance with aspects of the present invention.

Referring to FIG. 3B, a flow diagram 320 shows the process steps carried out by a responder, connected to a backend messaging manager system, to which a request is sent. The responder consumes 321 the requests. The responder creates 322 a reply and copies the identifier from the request into the reply. The responder sends 323 the reply to the destination specified in the request. The messaging manager system is aware that the specified destination is an RQ and sends 325 the reply to all message managing systems which host the RQ.

Figure 3C:
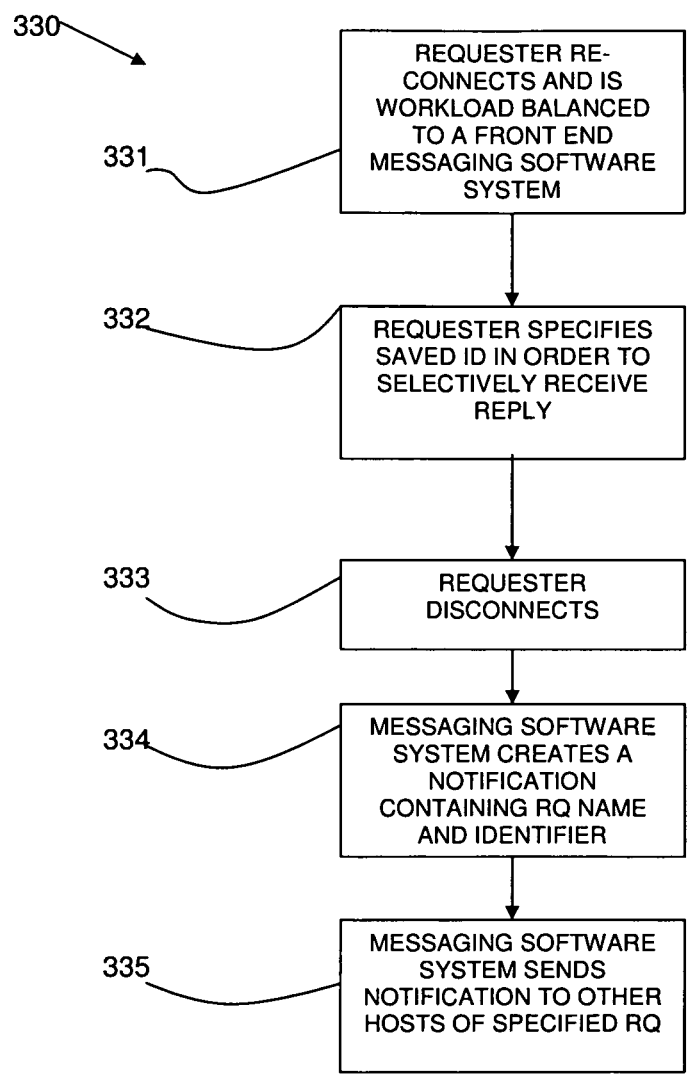
FIG. 3C is a flow chart of processing carried out by a requester when it re-connects in accordance with aspects of the present invention.

Referring to FIG. 3C, a flow diagram 330 shows the process steps carried out by a requester when it re-connects. The requester re-connects 331 and is workload balanced to any one of the front end message managing systems. The requester specifies the saved identifier from the request in order to selectively receive 332 the reply and disconnects 333. When the messaging manager system delivers the reply to the requester, it creates 334 a notification message containing the name of the RQ and the identifier of the reply that has been consumed. The messaging manager system sends 335 the notification message to the other hosts of the specified RQ. The deletion notification component deletes the specified reply.

Figure 4A:
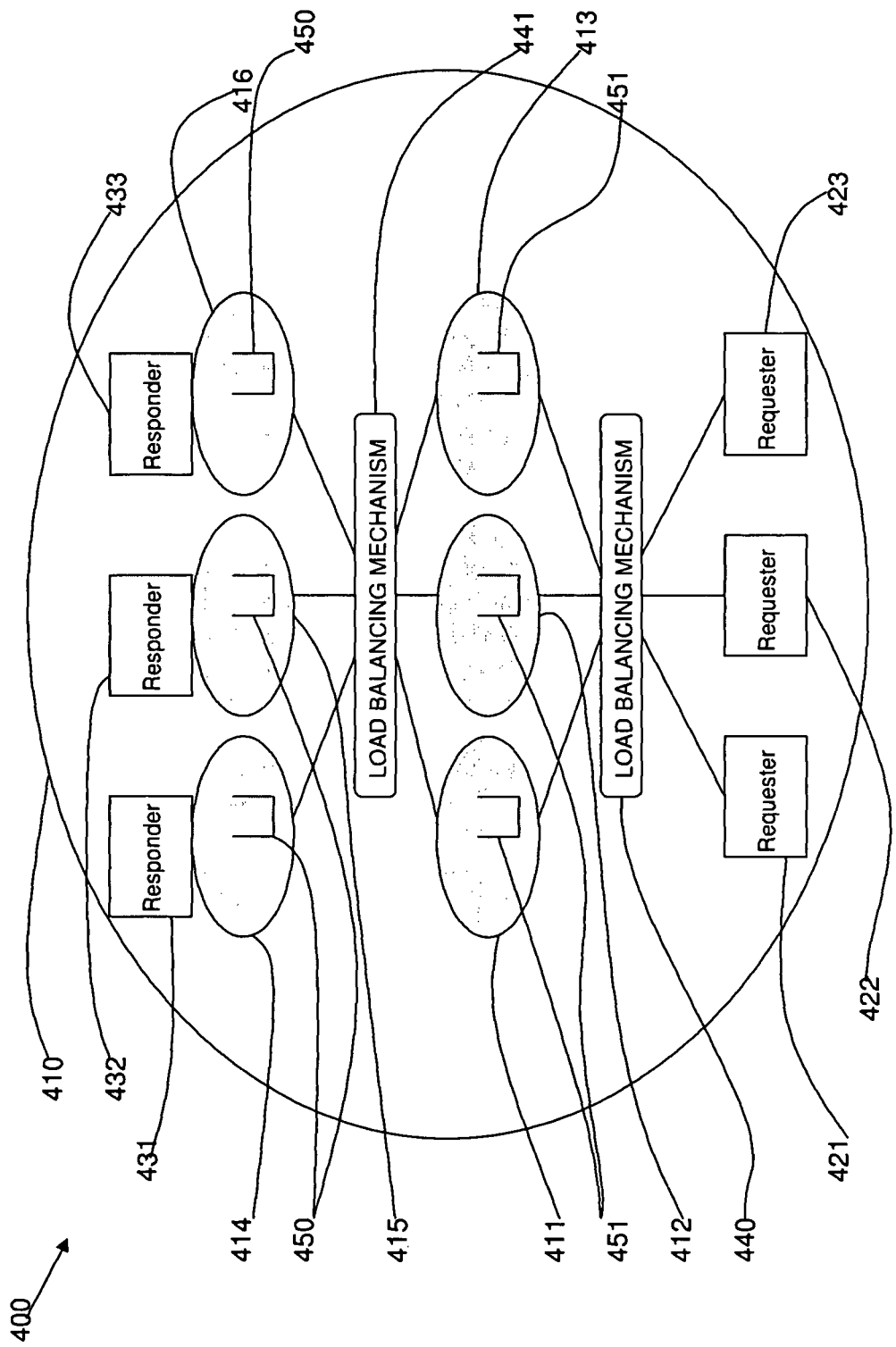
FIG. 4A is a block diagram of a system in accordance with the present invention.

A system diagram is shown in FIG. 4A of a messaging system 400 with a messaging network 410 with front end message managing systems 411-413 and backend message managing systems 414-416. Requester connections 421-423 are load balanced via a load balancing mechanism 440 to one of the front end message managing systems 411-413. A second load balancing mechanism 441 load balances requests from the front end message managing systems 411-413 to the backend message managing systems 414-416. Responders 431-433 are connected to the backend message managing systems 414-416.

The backend message managing systems 414-416 each host an RQ 450 and the front end message managing systems 411-413 each host an RQ 451.

In one embodiment, RQs may be implemented as a special type of cluster queue. An example implementation is described in the context of and sold under the trademark WEBSPHERE MQ clusters (WebSphere MQ is a trademark of International Business Machines Corporation). A messaging network may be provided in the form of queue managers in a WebSphere MQ cluster, with queue managers in the cluster being automatically made aware of the RQs in the cluster. When a message consumer creates a reply message, it copies information from the request message into the reply message by copying MQMD.MsgId to MQMD.CorrelId to allow message producers to correlate requests and replies. The message consumer that originally put the request either remains connected or re-connects to any of the front end queue managers and receives the reply message held on the RQ on that queue manager. The application uses the correlation information of the MQMD.CorrelId in order to receive the specific reply message it is interested in.

Figure 4B:
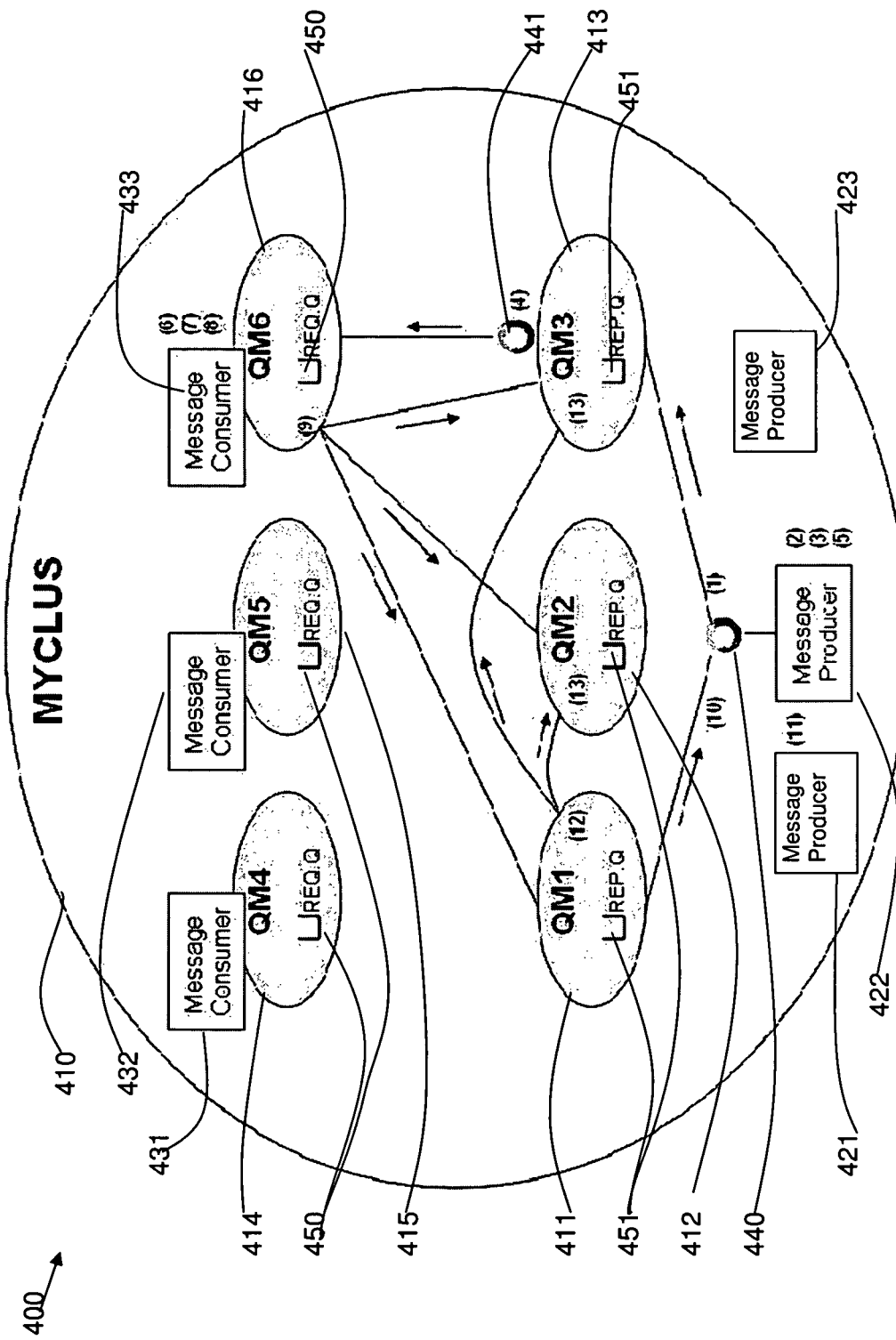
FIG. 4B is a block diagram of an embodiment of a system illustrating a message flow in accordance with the present invention.

Referring to FIG. 4B, the messaging system 400 of FIG. 4A is shown in the context of a WebSphere MQ cluster 410 (MYCLUS) of message managing systems in the form of queue managers 411-416. Three backend queue managers 414-416 (QM4, QM5 and QM6) and three front end queue managers 411-413 (QM1, QM2 and QM3) are shown. Message producer client applications 421-423 connect via a load sharing mechanism 440 to one of the front end queue managers 411-413, put a request message to a cluster queue 450 (REQ.Q) hosted on all the backend queue managers 414-416 and then disconnect. The message consumer applications 431-433 connected to the backend queue managers 414-416, get request messages from the cluster queue 450 (REQ.Q), and put reply messages to a RQ queue 451 (REP.Q). Each front end queue manager 411-413 has a RQ queue 451 (REP.Q). The reply message may be retrieved from any of the front end queue managers 411-413.

The request queues are created as follows:
!QM4 DEF QL(REQ.Q) CLUSTER(MYCLUS)
!QM5 DEF QL(REQ.Q) CLUSTER(MYCLUS)
!QM6 DEF QL(REQ.Q) CLUSTER(MYCLUS)
The reply queues are created as follows:
!QM1 DEF RQ(REP.Q) CLUSTER(MYCLUS)
!QM2 DEF RQ(REP.Q) CLUSTER(MYCLUS)
!QM3 DEF RQ(REP.Q) CLUSTER(MYCLUS)

Note that once an RQ is defined, the queue manager on which it is defined automatically subscribes for information related to the queue (i.e. notification messages).

The following steps (referenced in FIG. 4B) explain the behaviour for a single request and reply.
1) The message producer client application connects and is workload balanced (e.g. using an IP load balancer or the WebSphere MQ client channel definition table) to a particular front end queue manager. In this case it is workload balanced to QM3.
2) The message producer client application creates a request message, fills in a MQMD.ReplyToQ name of REP.Q and saves the MQMD.MsgId.
3) The message producer client application puts the request message to REQ.Q. As REQ.Q is a cluster queue QM3 is aware of it and may route messages to it.
4) The cluster workload balancing algorithm is executed and in this case chooses to send the request message to QM6. The message is sent over cluster channels to QM6 and put on REQ.Q.
5) The message producer client application disconnects (or connection fails). Note, this may actually happen at any point between step 3 and step 10.
6) The message consumer application on QM6 gets and processes (e.g. database update) the request message.
7) The message consumer application on QM6 creates the reply message and copies the MQMD.MsgId from the request message into the MQMD.CorrelId in the reply message.
8) The message consumer application on QM6 puts the reply message to the destination specified in the MQMD.ReplyToQ of the request message (REP.Q).
9) QM6 is aware that REP.Q is an RQ and so ignores any MQOD.ObjectQMgrName specified and publishes the reply message to all queue managers that host REP.Q, so that a copy of the reply message now exists on REP.Q on QM1, QM2 and QM3. Note that ignoring the ObjectQMgrName allows existing applications to take advantage of RQs.
10) The message producer client application connects and is workload balanced (e.g. using either an IP load balancer or the WebSphere MQ client channel definition table) to a particular front end queue manager. In this case it is workload balanced to QM1.
11) The message producer client application specifies the saved message ID (from the request message) in the reply message MQMD.CorrelId, gets the reply message, and disconnects.
12) QM1 notices that a reply message has been removed from the RQ (REP.Q) and automatically creates a notification message containing the name of the RQ (REP.Q) and the CorrelId of the reply message that has just been removed (i.e. the same CorrelId that is in the other reply messages on the other RQs). QM1 then publishes the notification to the other hosts of REP.Q, which are already subscribing for these notifications.
13) QM2 and QM3 get the publication and use the information in the notification message to delete the specified message from the specified RQ (REQ.Q). Note that QM1 does not receive the notification as local deliveries are not in effect.

As with all application connections, there is a window where, if the connection fails during commit, the application cannot be sure if the commit completed or not. The following scenarios describe two problem commits.

1) The application issues a commit call, the commit fails, the connection fails, and the application receives a "connection broken" return code from the commit call. The reply is still available.
2) The application issues a commit call, the commit completes successfully, the connection fails, and the application receives a "connection broken" return code from the commit call. The reply is no longer available.

The problem in scenarios 1) and 2) is that the application does not know if the commit actually completed or not. The same problem exists with all applications that commit. The solution is that the application (being the sole consumer of the individual message) may assume the commit worked if the message is no longer available from the messaging manager system. There are two example solutions:
a) If the application receives a "connection broken" in response to a commit call, the application may reconnect to the same messaging manager system to which it issued the commit and check for the reply. If the reply does not exist, it may be assumed that the commit succeeded and the application may continue processing. If the reply exists, it may be consumed again and committed again. Although this creates an affinity, the "affinity window" is much reduced when using the RQ system.
b) Ignore the error and continue with the assumption that the commit succeeded. If the commit did succeed, the reply is removed from the RQ and no more action need be taken. If the commit failed, the reply remains on the RQ. As all applications consuming replies are selecting uniquely identifiable replies, no other application may consume the remaining replies, so the problem now is how to clear up the remaining replies. Either expiration or manual clearing of RQs may be used.

This described method and system increases availability in request/reply scenarios. The solution provides availability improvements with minimal effect on message round trip time. A time increase may be associated with the sending of replicated replies if there are a very large number of hosts of the RQ because all replies are likely to be sent in one unit of work. It is worth noting that it is unlikely that a large number of RQs are required, for availability requirements at least. Also, the deletion of surplus replies is done outside any units of work associated with message round trip time.

The solution is designed so that a network containing n RQs may deliver replies in the event of the failure of up to n−1 message managing systems which host the RQ. Typically, one may expect two or three RQs to provide enough redundancy.

In certain (failure) scenarios this model produces duplicate replies that are not deleted in a timely manner. This solution assumes that the replies are selectively processed (e.g. by unique identifier). Once a reply has been consumed, the selection criteria held by the application is cleared so that the application does not attempt to read any existing duplicate replies from other RQs. If selective replies are not required, any thread or application may process replies, thus negating the need for RQs altogether (a simple destination may suffice).

The invention may take the form of an entirely hardware embodiment, an entirely software embodiment or an embodiment containing both hardware and software elements. In an embodiment, the invention is implemented in software, which includes but is not limited to firmware, resident software, microcode, etc.

The invention may take the form of a computer program product accessible from a computer-usable or computer-readable medium providing program code for use by or in connection with a computer or any instruction execution system. For the purposes of this description, a computer usable or computer readable medium may be any apparatus that may contain, store, communicate, propagate, or transport the program for use by or in connection with the instruction execution system, apparatus or device.

The medium may be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications may be made to the foregoing without departing from the scope of the present invention.

What is claimed is:

1. A method for message delivery in messaging networks, comprising:
    creating, in response to receipt of a request message from a requester, a reply message comprising a message identifier of the request message copied from the received request message into a message correlation identifier of the reply message;
    sending publishing the reply message to each of a plurality of replicated message queues, where the plurality of replicated message queues comprise a set of individual message queues upon which messages are replicated, where a copy of the reply message exists by publication on each of the plurality of replicated message queues, and where the reply message is identifiable by the requester using the message identifier of the request message copied into the message correlation identifier of the reply message on any one of the plurality of replicated message queues prior to being consumed by the requester;
    removing, via the requester, the reply message from one of the plurality of replicated message queues using the message identifier;
    creating, via a message managing system that hosts the one of the plurality of replicated message queues, a notification message in response to the requester removing the reply message from the one of the plurality of replicated message queues, the notification message comprising a name of at least the one of the plurality of replicated message queues from which the message was removed and the message identifier; and
    publishing the notification message to other message managing systems in association with which the plurality of replicated message queues are defined.

2. The method of claim 1, where publishing the reply message to each of the plurality of replicated message queues comprises sending the reply message to each of a plurality of message managing systems in association with which the plurality of replicated message queues are defined.

3. The method of claim 1, where the reply message is associated with a request/reply messaging architecture.

4. The method of claim 1, further comprising ignoring a messaging manager system specified in association with the request message.

5. A system for message delivery, comprising:
    a messaging network comprising a plurality of message managing systems provided on one or more processors;
    a plurality of replicated message queues for reply messages, where the plurality of replicated message queues comprise a set of individual message queues upon which messages are replicated, and where each reply message is operable to be identified by an application using a message identifier of an associated request message copied from the associated request message into a message correlation identifier of an associated reply message before each reply message is read, the plurality of replicated message queues being hosted in association with the plurality of message managing systems;
    where:
        each reply message is published in response to the associated request message to each of the plurality of replicated message queues to be accessible by an associated requester using any one of the plurality of message managing systems, where a copy of the reply message exists by publication on each of the plurality of replicated message queues;
        the reply message is removed via the associated requester from one of the plurality of replicated message queues using the message identifier;
        a notification message is created, via one of the plurality of message managing systems that hosts the one of the plurality of replicated message queues, in response to the associated requester removing the reply message from the one of the plurality of replicated message queues, the notification message comprising a name of the one of the plurality of replicated message queues from which the message was removed and the message identifier; and
        the notification message is published to other of the plurality of message managing systems in association with which the plurality of replicated message queues are defined.

6. The system of claim 5, where the messaging network comprises a plurality of front end message managing systems and a plurality of backend message managing systems, and further comprising:
    a requester connectable to one of the front end messaging manager systems; and
    a responder connectable to one of the backend message managing systems.

7. The system of claim 6, further comprising:
    a first load balancing mechanism between the requester and the front end message managing systems; and
    a second load balancing mechanism between the front end message managing systems and the backend message managing systems.

8. The system of claim 5, further comprising a plurality of front end message managing systems and a plurality of requesters, where the plurality of replicated message queues for reply messages is defined in association with the plurality of front end message managing systems for consumption by the plurality of requesters of the reply messages from any one of the plurality of front end message managing systems.

9. The system of claim 5, where each reply message is associated with a request/reply messaging architecture.

10. The system of claim 5, where each of the plurality of replicated message queues is manually definable on each of the plurality of message managing systems.

11. The system of claim 5, where a first of the plurality of replicated message queues is manually definable on one of the plurality of message managing systems and a remainder of the plurality of replicated message queues is automatically definable on a remainder of the plurality of message managing systems to form the plurality of replicated message queues in response to manual definition of the first of the plurality of replicated message queues.

12. The system of claim 5, further comprising:
means for receiving each request message comprising the message identifier;
means for creating each reply message comprising correlation information associated with the message identifier of the associated request message; and
means for publishing each reply message to each of the plurality of replicated message queues, where each reply message is identifiable by the message identifier of the associated request message copied into the message correlation identifier of the associated reply message prior to consumption by the requester and each request message comprises a reply-to destination comprising one of the plurality of replicated message queues definable on one of the plurality of message managing systems.

13. The system of claim 12, further comprising:
a message deletion component comprising:
means for creating the notification message to delete the reply message from other replicated message queues of the plurality of replicated message queues; and
means for publishing the notification message to at least one of the plurality of message managing systems that hosts at least one other replicated message queue of the plurality of replicated message queues.

14. The system of claim 5, where the plurality of message managing systems comprises a cluster of queue managers.

15. An apparatus for message delivery in a messaging network comprising a plurality of message managing systems provided on one or more processors; the apparatus comprising:
means for creating, in response to receipt of a request message from a requester, a reply message comprising a message identifier of the request message copied from the received request message into a message correlation identifier of the reply message;
means for sending publishing the reply message to each of a plurality of replicated message queues, where the plurality of replicated message queues comprise a set of individual message queues upon which messages are replicated, where a copy of the reply message exists by publication on each of the plurality of replicated message queues, and where the reply message is identifiable by the requester using the message identifier of the request message copied into the message correlation identifier of the reply message on any one of the plurality of replicated message queues prior to being consumed by the requester;
means for removing, via the requester, the reply message from one of the plurality of replicated message queues using the message identifier;
means for creating, via a message managing system that hosts the one of the plurality of replicated message queues, a notification message in response to the requester removing the reply message from the one of the plurality of replicated message queues, the notification message comprising a name of at least the one of the plurality of replicated message queues from which the message was removed and the message identifier; and
means for publishing the notification message to other message managing systems in association with which the plurality of replicated message queues are defined.

16. The apparatus of claim 15, where each of the plurality of replicated message queues is operable to be definable on one of the plurality of message managing systems; and
where the apparatus is configured to publish the reply message to each of the plurality of replicated message queues and to access the reply message using any one of the plurality of message managing systems.

17. The apparatus of claim 15, where the messaging network further comprises a plurality of front end message managing systems and a plurality of backend message managing systems, and where the apparatus further comprises:
the requester connectable to one of the plurality of front end messaging manager systems; and
a responder connectable to one of the plurality of backend message managing systems.

18. The apparatus of claim 15, where the plurality of replicated message queues is definable on a plurality of front end message managing systems for consumption by the requester from any one of the plurality of front end message managing systems.

19. The apparatus of claim 18, where the requester is further configured to consume the reply message from any one of the plurality of replicated message queues using the message identifier.

20. The apparatus of claim 15, where the reply message is associated with a request/reply messaging architecture.

21. The apparatus of claim 15, where each of the plurality of replicated message queues is manually definable on each of the plurality of message managing systems and where a first of the plurality of replicated message queues is manually definable on one of the plurality of message managing systems and a remainder of the plurality of replicated message queues is automatically definable on a remainder of the plurality of message managing systems to form the plurality of replicated message queues.

22. The apparatus of claim 15, further comprising:
means for receiving the request message comprising the message identifier;
means for creating the reply message comprising correlation information associated with the message identifier of the request message; and
means for publishing the reply message to each of the plurality of replicated message queues, where the reply message is identifiable by the message identifier of the request message copied into the reply message correlation identifier of the reply message prior to consumption by the requester and the request message comprises a reply-to destination comprising one of the plurality of replicated message queues definable on one of the plurality of message managing systems.

23. The apparatus of claim 22, further comprising:
a message deletion component comprising:
the means for creating the notification message comprising means to create a notification to other message managing systems to delete the reply message from other replicated message queues of the plurality of replicated message queues; and
the means for publishing the notification message to other message managing systems comprising means to publish the notification message to at least one of the plurality of message managing systems that hosts at least one other replicated message queue of the plurality of replicated message queues.

24. The apparatus of claim 15, where the plurality of message managing systems comprise a cluster of queue managers.

\* \* \* \* \*